(12) United States Patent
Fehr

(10) Patent No.: US 11,072,294 B2
(45) Date of Patent: Jul. 27, 2021

(54) BED RAIL BICYCLE MOUNT

(71) Applicant: Curt Manufacturing, LLC, Eau Claire, WI (US)

(72) Inventor: Robert G. Fehr, Colfax, WI (US)

(73) Assignee: Curt Manufacturing, LLC, Eau Claire, WI (US)

( * ) Notice: Subject to any disclaimer, the term of this patent is extended or adjusted under 35 U.S.C. 154(b) by 18 days.

(21) Appl. No.: 16/443,449

(22) Filed: Jun. 17, 2019

(65) Prior Publication Data

US 2019/0381947 A1 Dec. 19, 2019

Related U.S. Application Data

(60) Provisional application No. 62/686,574, filed on Jun. 18, 2018.

(51) Int. Cl.
*B60R 9/10* (2006.01)
*B62H 3/08* (2006.01)
*B60R 9/06* (2006.01)

(52) U.S. Cl.
CPC ............... *B60R 9/10* (2013.01); *B60R 9/06* (2013.01); *B62H 3/08* (2013.01)

(58) Field of Classification Search
CPC .... B60R 9/10; B60R 9/06; B60R 9/00; B60R 9/045; B60R 9/04; B62H 3/08
USPC ........................................................ 224/405
See application file for complete search history.

(56) References Cited

U.S. PATENT DOCUMENTS

| | | | |
|---|---|---|---|
| 5,445,300 A * | 8/1995 | Eipper | B60R 9/06 224/496 |
| 5,862,966 A | 1/1999 | Mehls | |
| 5,988,403 A | 11/1999 | Robideau | |
| 6,053,336 A * | 4/2000 | Reeves | B62H 3/08 211/17 |
| 6,179,181 B1 | 1/2001 | Johnson et al. | |
| 6,394,326 B1 | 5/2002 | Lanier | |
| 6,491,195 B1 | 12/2002 | McLemore et al. | |
| 6,523,731 B1 | 2/2003 | Pedrini | |
| 6,695,184 B2 | 2/2004 | Higginbotham, III | |
| 6,752,303 B2 | 6/2004 | McLemore et al. | |
| 6,834,786 B2 | 12/2004 | Hansen | |
| 7,044,347 B1 | 5/2006 | Pedrini | |
| 7,240,816 B2 | 7/2007 | Tsai | |
| 7,857,177 B2 | 12/2010 | Reeves et al. | |
| 8,113,398 B2 | 2/2012 | Sautter et al. | |
| 8,235,267 B2 | 8/2012 | Sautter et al. | |
| 8,763,870 B2 | 7/2014 | Davis | |
| 8,985,411 B2 | 3/2015 | Heininger | |
| 9,022,265 B2 | 5/2015 | Wolfe et al. | |

(Continued)

*Primary Examiner* — Corey N Skurdal
(74) *Attorney, Agent, or Firm* — Shewchuk IP Services, LLC; Jeffrey D. Shewchuk

(57) ABSTRACT

A bicycle mount which mounts a bicycle longitudinally over the bed rail of a pickup truck. A carriage of the bicycle mount supports the wheels of the bicycle above it. A pivot arm and hook is used as a primary vertical support for the bicycle, with the pivot arm mounted using slide channels of the carriage to allow both longitudinal and pivoting motion. The hooks is extendable on the pivot arm to support an upper section of the bicycle frame. A mounting system for the carriage is provided allows the carriage to mount into stake pockets of the bed rail, adjustable to accommodate different length bed rails and different stake pocket spacing on different pickup trucks.

20 Claims, 8 Drawing Sheets

(56) References Cited

U.S. PATENT DOCUMENTS

| | | | |
|---|---|---|---|
| 9,493,123 B2* | 11/2016 | Martin | B60R 9/00 |
| 9,956,922 B2 | 5/2018 | Phillips | |
| 10,011,237 B1 | 7/2018 | Phillips | |
| 10,040,490 B2* | 8/2018 | Schlaupitz | B60R 9/10 |
| 10,065,568 B2 | 9/2018 | Phillips | |
| 10,124,740 B2 | 11/2018 | Phillips | |
| 2006/0196906 A1 | 9/2006 | Gibson, Jr. | |
| 2008/0142559 A1 | 6/2008 | Lim et al. | |
| 2008/0143133 A1* | 6/2008 | Nichols | B60P 7/0815 296/3 |
| 2010/0072237 A1 | 3/2010 | Green | |
| 2011/0266322 A1 | 11/2011 | Jones | |
| 2013/0062383 A1* | 3/2013 | Jeli | B60R 9/10 224/497 |
| 2014/0117062 A1 | 5/2014 | Kraeuter | |
| 2018/0361944 A1 | 12/2018 | Marchlewski et al. | |
| 2019/0176714 A1* | 6/2019 | Marchlewski | B60R 9/00 |

* cited by examiner

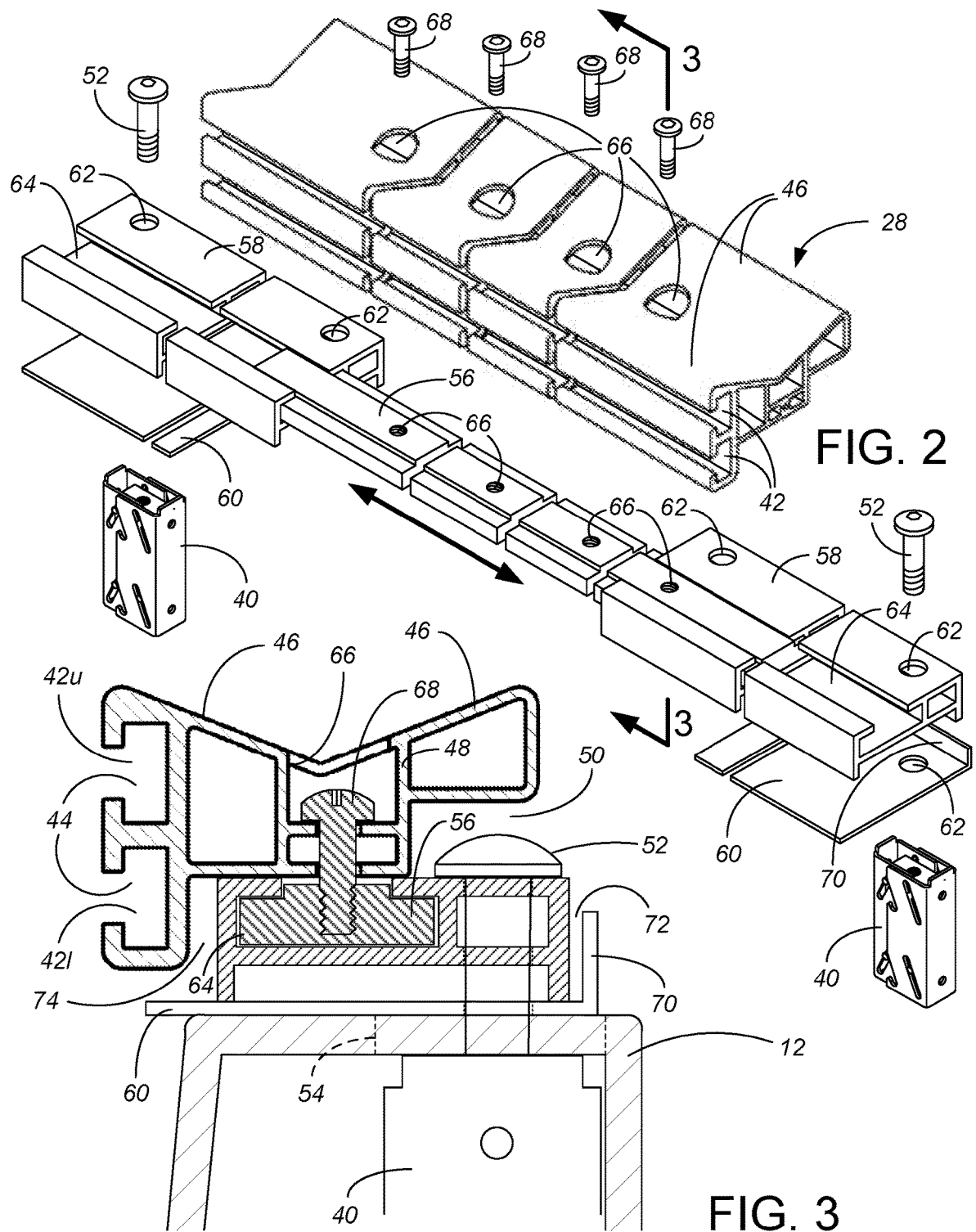

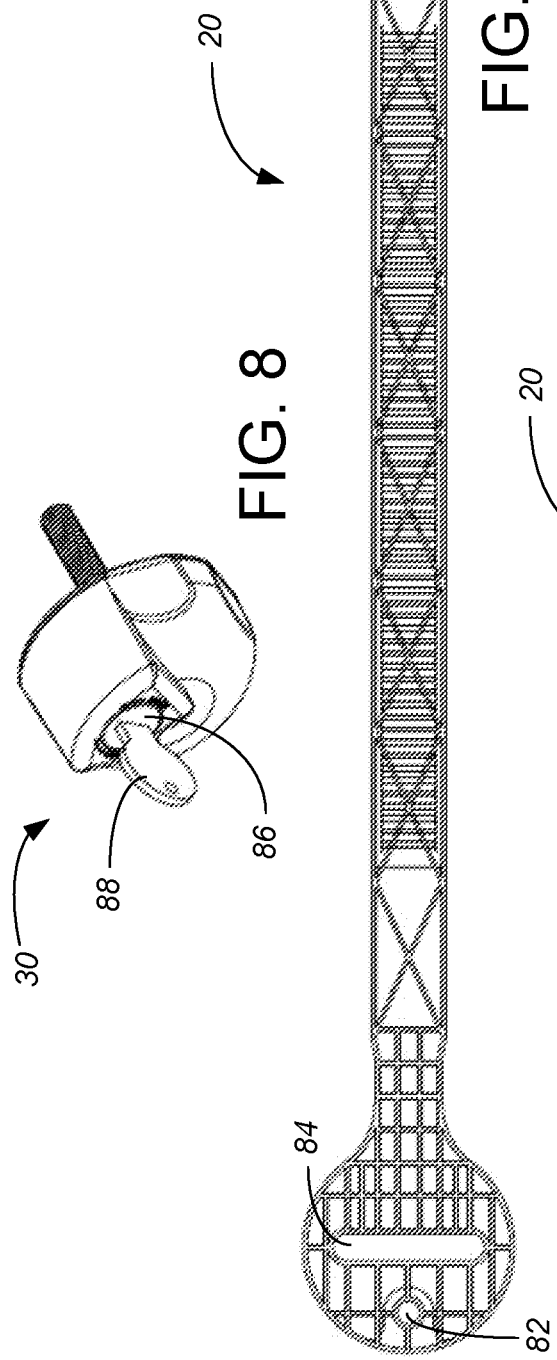
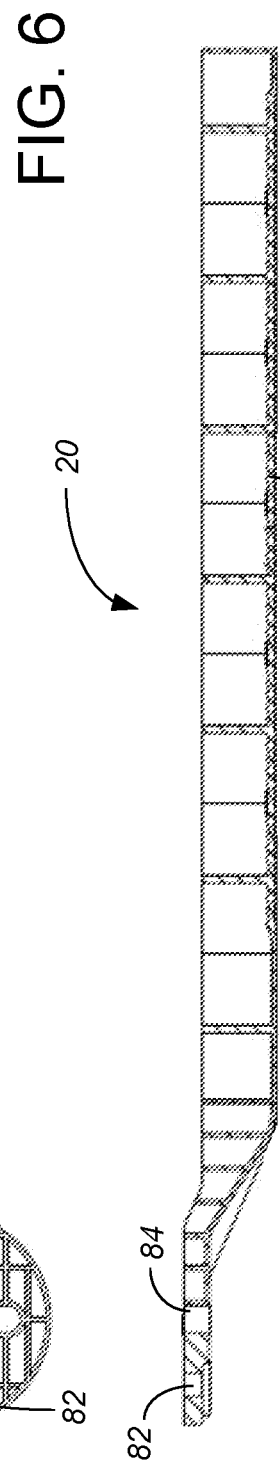
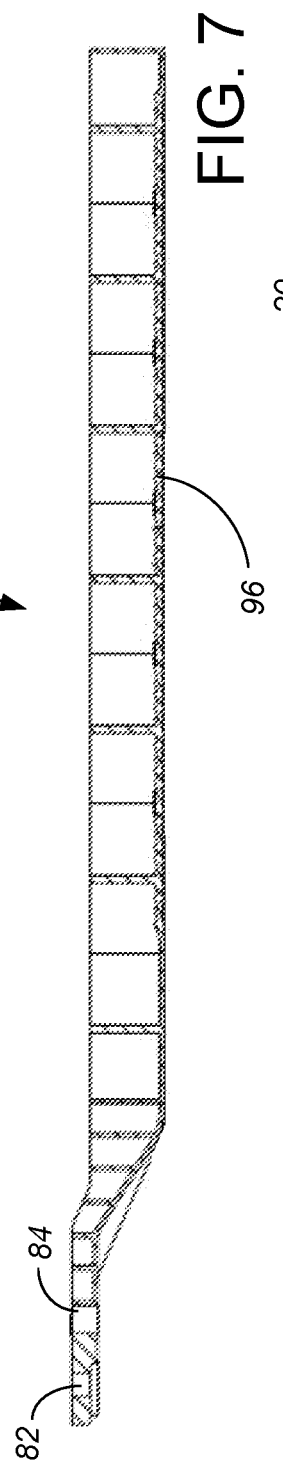
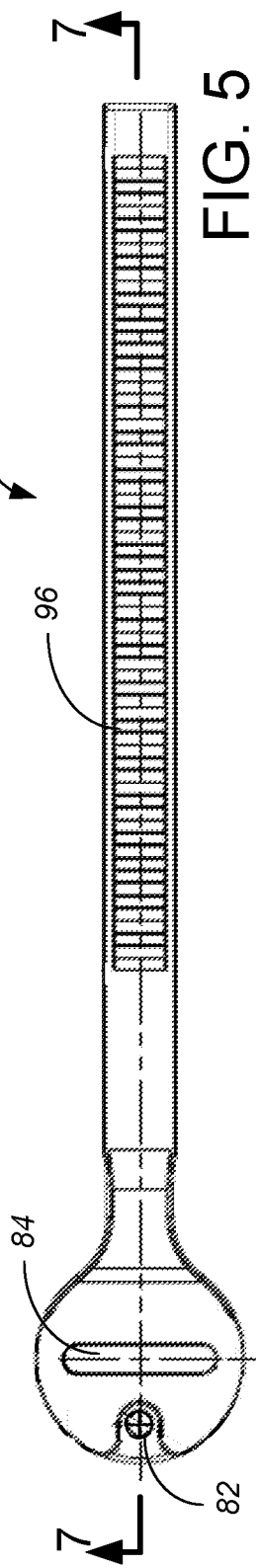
FIG. 8
FIG. 6
FIG. 7
FIG. 5

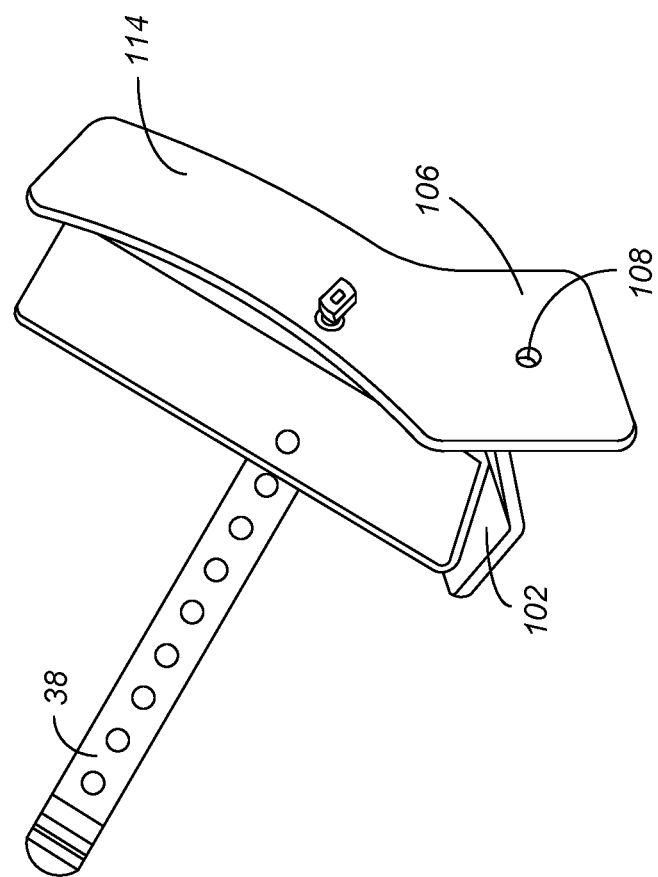
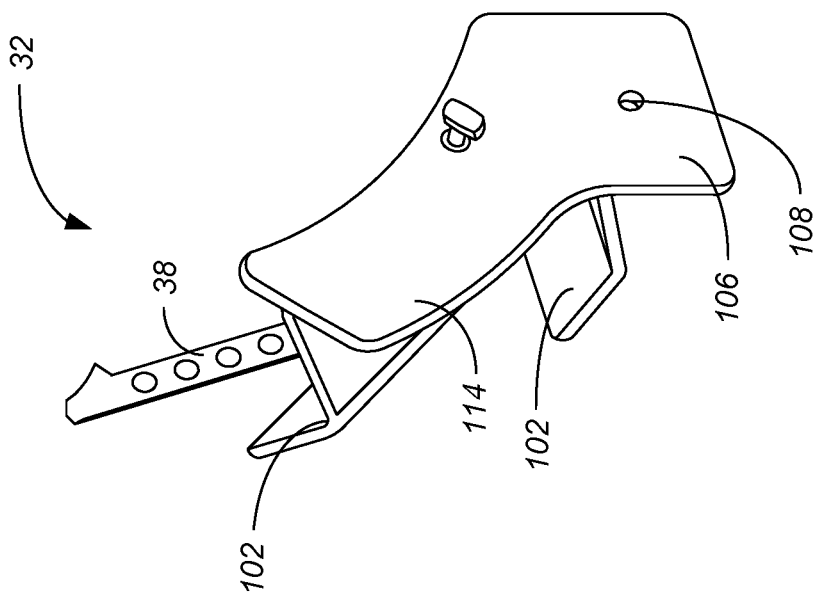
FIG. 14

BED RAIL BICYCLE MOUNT

CROSS-REFERENCE TO RELATED APPLICATION(S)

The present application claims priority from U.S. Provisional Application No. 62/686,574 entitled BED RAIL BICYCLE MOUNT filed Jun. 18, 2018, incorporated herein by reference.

BACKGROUND OF THE INVENTION

Pickup trucks are a favored type of personal vehicle for many people and purposes. Pickup trucks are characterized by having a bed behind the cab, defined on the sides by bed rails and typically defined on the rear by a tailgate, surrounding a bed platform. Many people who drive pickup trucks also like to ride bicycles, and a pickup truck can be used to transport a bicycle by placing the bicycle in the bed.

However, often a pickup truck owner would like to haul other cargo or loads within the bed, while simultaneously transporting one or two bicycles. Additionally, many different types of exterior accessory products are known for attachment to the bed of a pickup truck, such as tonneau covers or fifth wheel hitches. If something else substantially occupies the pickup truck bed, transport of one or two bicycles with the pickup truck can be difficult or impossible. One solution is a bicycle rack supported off the rear of the vehicle, such as by a towing hitch. But those solutions may make additional towing (of a boat or a trailer, for instance) impossible, and at a minimum extend the length of the pickup truck vehicle. Further, the bicycle when supported can interfere with aerodynamic slipstreaming of the pickup truck. Better solutions for transporting a bicycle using a pickup truck are needed.

BRIEF SUMMARY OF THE INVENTION

The present invention is a bicycle mount which mounts the bicycle to the bed rail of a pickup truck, as well as a method of using such a bicycle mount. The bicycle mount includes a carriage which supports the wheels of the bicycle above it and, possibly using wheel supports, secures the wheels of the bicycle against lateral and longitudinal movement. A primary vertical support extends upward from the carriage and is positionable to hold the bicycle generally upright over the carriage structure. In the preferred embodiment, the primary vertical support includes a hook which wraps over the bike frame, and can be moved both pivotally and longitudinally on the carriage as well as up or down. The carriage preferably includes one or more sliding connections that allow the longitudinal movement of both the primary vertical support and the wheel supports. A mounting system for the carriage is provided that preferably allows the carriage to mount into stake pockets of the bed rail, adjustable to accommodate different length bed rails and different stake pocket spacing on different pickup trucks.

BRIEF DESCRIPTION OF THE DRAWINGS

FIG. 2 is an outer side perspective view of the preferred stake pocket anchors, reinforcement plates, tracks, carriage rail, and carriage used in the bed rail bicycle mount of FIG. 1, exploded to better understand assembly steps. In FIG. 2, three breaks are shown in the carriage and carriage rail, and one break in each track and each reinforcement plate, to designate that length is not shown to scale relative to height and width.

FIG. 3 is a cross-sectional view taken along cut lines 3-3 of FIG. 2 but after assembly, and further showing a bed rail and preferred stake pocket anchor supporting and securing the track mount and carriage, with the inside of the truck bed to the right as drawn.

FIG. 5 is a side (outer side) view of the pivot arm used in the carriage assembly of FIGS. 1 and 4.

FIG. 6 is an opposite side (inner side) view of the pivot arm of FIGS. 1, 4 and 5.

FIG. 7 is a cross-sectional view of the pivot arm of FIGS. 1 and 4-6, taken along cut line 7-7 in FIG. 5.

FIG. 8 is a perspective view of the locking knob, three of which are preferably used in the carriage assembly for attaching both the pivot arm of FIGS. 4-6 and two wheel hoops to the carriage.

FIG. 14 is an outer side perspective view of a first alternative set of wheel supports and straps, shown without their knobs.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

Figure 1:
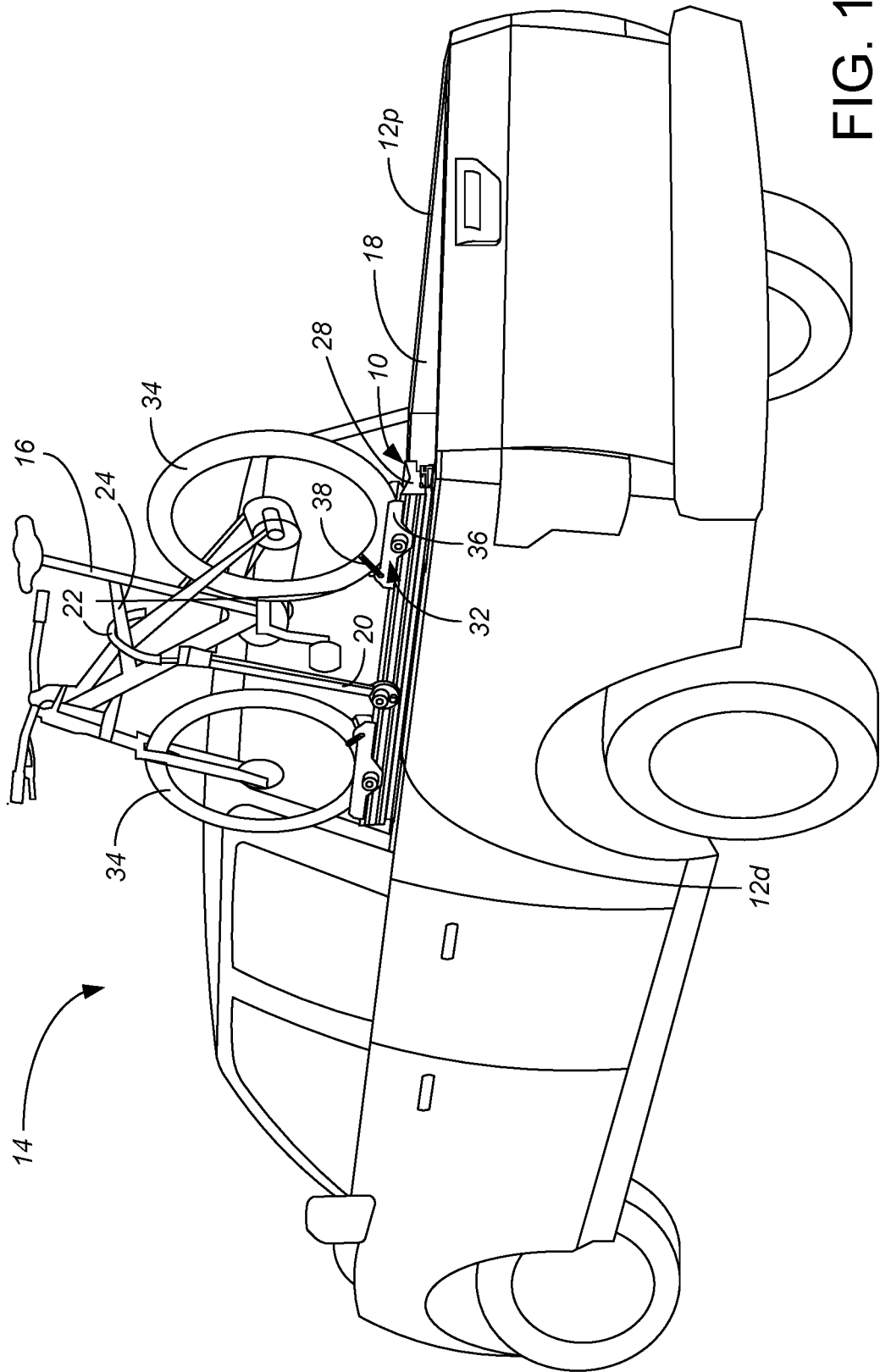
FIG. 1 is a perspective view of a preferred embodiment of a bed rail bicycle mount of the present invention, supporting a bicycle on a bed rail of a pickup truck.

The invention is a bicycle mount 10, which mounts onto a bed rail 12 of a pickup truck 14, with a first preferred embodiment and its primary component parts shown in FIGS. 1-13. The mount 10 allows a bicycle 16 to be supported vertically above a longitudinally extending bed rail 12, such that the bike 16 extends longitudinally on the truck 14 in a position which does not interfere with most tonneau covers (not shown) and which leaves the vast majority of the truck bed 18 open for carrying other cargo (not shown) or accessories (not shown). The bicycle mount 10 is mounted onto the top of either the driver side bed rail 12*d* (as shown in FIG. 1) or passenger side bed rail 12*p* of the pickup truck 14.

A pivot arm 20 and hook 22, further described below with reference to FIGS. 4-9, is looped over the top of the frame 24 of the bicycle 16 to provide the primary upright stabilization for the bicycle 16. The pivot arm 20 and hook 22 is lengthwise adjustable, preferably by a ratchet connection 26 regulating a telescoping arrangement between the hook 22 and the pivot arm 20. The pivot arm 20 is also preferably angularly adjustable relative to the carriage 28. Once in place and at the desired length/height to stabilize the bicycle frame 24, the pivot arm 20 and hook 22 is tightened in place by hand with a knob 30. The knob 30 on the bicycle mount 10 faces outside the pickup truck 14 and is accessible by a person (not shown) standing on the ground outside the pickup truck bed 18. When mounting the bicycle mount 10 to the passenger side bed rail 12p, the bicycle mount 10 is turned around, so the front side of the bicycle mount 10 shown in FIG. 1 becomes the rear, such that the locking knob 30 still faces outside the pickup truck 14 and is accessible outside the pickup truck bed 18. Alternatively, two bicycle mounts 10 can be simultaneously used, one on the driver side bed rail 12d and one on the passenger side bed rail 12p of the pickup truck 14, for occasions when two bicycles 16 are to be transported.

In addition to the primary upright stabilization for the bicycle 16 provided in the preferred embodiment by the pivot arm 20 and hook 22, the bicycle mount 10 includes a wheel securement structure 32 which secures the wheels 34 of the bicycle 16 at least laterally, and more preferably both laterally and in the fore-aft direction, relative to the bed rail 12. In the preferred embodiment, the wheel securement structure 32 includes two wheel supports 36 and wheel straps 38, further described below with reference to FIGS. 4 and 10-13.

The carriage 28 of the preferred bicycle mount 10 is held in place on top of the bed rail 12, such as by using stake pocket anchors 40 such as disclosed in U.S. Pat. Pub. No. 2017/0120961 for application Ser. No. 15/338,193, (now U.S. Pat. No. 10,023,247) incorporated by reference. Other types of stake pocket anchors, such as those disclosed in U.S. Pat. Nos. 3,351,356, 3,421,726, 3,950,010, 4,316,688, 4,607,991, 5,141,277, 5,273,382, 5,326,203, 5,915,900, 6,290,441, 6,464,437 or 7,594,478 could alternatively be used, as could other types of attachment mechanisms including simple bolts or adhesives. However, the preferred stake pocket anchors 40 provide a tight and secure connection between the carriage 28 and the top of the bed rail 12, while at the same time allowing ready removal of the bicycle mount 10 from the bed rail 12 and without requiring any permanent alteration of the bed rail 12.

The preferred carriage 28 of the bicycle mount 10 is better shown in FIGS. 2 and 3. The carriage 28 provides protection to the top of the bed rail 12. The carriage 28 also provides attachment locations for the upright stabilization structure 20/22 and the lower lateral wheel securement structure 32. The carriage 28 should be able to provide very rigid connections, particularly important to maintain the verticality of the pivot arm 20 relative to the carriage 28 as the pivot arm 20 and hook 22 holds the bicycle 16 upright, including during driving of the pickup truck 14 around corners and during side winds. At the same time, the carriage 28 is preferably light in weight and cost, as well as being corrosion resistant for years or decades of outdoor use. In the preferred embodiment, the carriage 28 is extruded from an aluminum-based material, most preferably 6063 T5 aluminum alloy which can be coated with a black anodize finish.

To provide flexibility for virtually any size of bicycle, the upright stabilization structure 20/22 and the lower lateral wheel securement structure 32 are attached using at least one, and more preferably (at least for the upright stabilization structure 20/22) two sliding recesses 42. Of course, the sliding recesses 42 could be replaced with a plurality of bolt holes, but using sliding recesses 42 allows for finer longitudinal adjustment. The sliding recesses 42 preferably run the entire length of the carriage 28, accessible from their ends during assembly of the upright stabilization structure 20/22 and the lower lateral wheel securement structure 32 to the carriage 28, open at the outer side for sliding movement of the upright stabilization and the lower lateral wheel securement structures 20/22 and 32. When formed of the 6063 T5 aluminum alloy, the sliding recesses 42 can be formed with a wall thickness of about 5 mm. Each sliding recess 42 includes a neck 44 which is smaller than the width of the sliding recess 42 itself. The preferred sliding recesses 42 are rectangular, having a width of about 25 mm and a depth of about 11 mm. The preferred necks 44 are each about 13 mm wide.

The two sliding recesses 42 are vertically spaced to withstand the moments which can be placed on the carriage 28 particularly by the pivot arm 20. The rigidity and stability of the bicycle mount 10 is very important, to hold the bike 16 vertically and withstand the moments the bike 16 places on the mount 10 as the pickup truck 14 accelerates around corners at various road angles and wind conditions. The design also allows the bike 16 to be easily loaded from outside the vehicle 14. In the preferred embodiment, the center lines of the two sliding recesses 42 are vertically spaced about 31 mm apart, i.e., the top of the upper sliding recess 42u is about 57 mm higher than the bottom of the lower sliding recess 42l. While using the 5 mm wall thickness, this means the carriage 28 itself has an overall height of at least 67 mm; in the preferred embodiment using the V top-shape, the preferred carriage 28 has an overall height of about 70 mm.

In addition to providing two vertically-spaced sliding recesses 42, the preferred carriage 28 is characterized by having a V top-shape. The V top shape is generally intended for centering the bottoms of a large number of bicycle tires, including street racing bikes, mountain bikes and fat-tire bikes, tending to align the front wheel 34f so when balanced on the carriage 28 the front bicycle wheel 34f is not turning to the left or right. At the same time, the top of the carriage 28 should be wide enough to give the user comfort that the bicycle wheels 34 can be relatively easily placed onto the carriage 28 when hoisting the bike 16 into position. In the most preferred embodiment, the V-top shape provides an overall width of the carriage 28 of about 108 mm, providing two sloped top surfaces 46 that are 54 mm wide and at an angle of 137° with respect to each other.

As noted above, the rigidity of the carriage 28 is quite important. However, the V top shape does not have to withstand the same moments and stresses that are placed on the walls around the two sliding recesses 42, and accordingly can be made with a thinner wall thickness than around the sliding recesses 42. In the preferred embodiment of 6063 T5 aluminum alloy, while a 5 mm wall thickness is used around the sliding recesses 42, the remainder of the carriage 28 including the V top shape uses a wall thickness of about 3 mm, which amply supports the weight of the bicycle 16 in the extruded configuration shown having interior support walls 48. Indeed, a major function of the 3 mm wall thickness portion of the carriage 28 is to further support and provide rigidity to the 5 mm wall thickness sliding recesses 42 to withstand twisting moments during use.

At the inside edge of the carriage 28, the carriage 28 includes a recess 50 below the V top shape. As best seen in FIG. 3, this recess 50 avoids any interference with the stake pocket anchor bolt 52 so, depending upon the spacing between the stake pockets 54 on the particular pickup truck, part of the V top shape of the carriage 28 can be directly above the stake pocket 54, i.e., at the option of the assembler the carriage 28 can be positioned fully forward on the bed rail 12 up to the cab, fully rearward on the bed rail 12 back to the tailgate, or anywhere in between. In the preferred embodiment, the stake pocket anchor bolt recess 50 is about 18 mm tall and 32 mm wide.

The length of the carriage 28 is preferably long enough to accept the wheelbase span of virtually any adult size bicycle (i.e., at least 1000 mm, and more preferably at least 1200 mm, providing ample room for the wheel supports 36), but at the same time short enough to fit within the length of the bed rail 12 of the pickup truck 14. Standard pickup truck bed sizes include standard long bed, compact long bed, standard short bed and compact short bed, for which interior bed dimensions are about 2440 mm, about 2135 mm, about 1980 mm and about 1525 mm. In addition to the interior bed lengths, the carriage 28 can also extend over the length of the back (tailgate) bed rail, and over the front bed rail if present. To be able to fit within all these pickup truck sizes, the preferred carriage 28 has a length of 1556 mm.

The carriage 28 not only should be rigid in an of itself, but also must be securely attached relative to the top of the bed rail 12 to adequately support the bicycle 16 during use. While the carriage 28 could be directly mounted to the top of the bed rail 12, the preferred embodiment uses a tie down structure that includes one carriage rail 56, and then two tracks 58 (one per end) and two reinforcement plates 60 (one per end).

The tracks 58 and the reinforcement plates 60 include at least one opening in their ends, in the preferred embodiment a bolt hole 62, for insertion of the stake pocket anchor bolt 52. In the preferred embodiment, each track 58 and each reinforcement plate 60 includes two stake pocket anchor bolt holes 62, each about 40 mm from the end of the track 58 or reinforcement plate 60. By including a stake pocket anchor bolt hole 62 at each end, there is no difference between which track 58 is used in the front and which track 58 is used in the rear, and no difference between which reinforcement plate 60 is used in the front and which reinforcement plate 60 is used in the rear, resulting in a smaller inventory of parts and easier/less confusing assembly.

The tracks 58 and the reinforcement plates 60 are long enough to adequately transfer the weight of the bicycle 16 and the bicycle mount 10 to the bed rail 12, but less than half the length of the carriage 28. In the preferred mounting arrangement, the tracks 58 mate with the carriage rail 56 in a telescoping arrangement, and the carriage rail 56 has a length which matches the length of the carriage 28. Because the tracks 58 mate with the carriage rail 56 in a telescoping relationship, the spacing between the two tracks 58 can be changed, such that the two tracks 58 allow the carriage rail 56/carriage 28 to be mounted onto any standard bed rail length, i.e., by having the tracks 58 that are at least 442 mm long, and more preferably at least 500 mm long, they (when telescoped out) allow the preferred 1556 mm carriage 28 to be used between the stake pocket anchors 40 even of standard long bed pickup trucks. The preferred tracks 58 are about 560 mm in length, so when telescoped out for a 2440 mm standard long bed, there is still over 100 mm of telescoping overlap between each track 58 and the carriage rail 56. As an alternative for mounting onto certain long bed rails, the bicycle mount 10 may be mounted using one or more intermediate stake pockets (other than the front stake pocket and the rear stake pocket on the truck) which are closer together than 2400 mm. The preferred tracks 58 are extruded and use the same 6063 T5 aluminum alloy material with a black anodize finish as the carriage 28, with a 4 mm wall thickness.

The carriage rail 56 fits within a sliding track 64 of the tracks 58, in the preferred embodiment with an ample clearance of about 1 mm. The preferred carriage rail 56 is extruded and uses the same 6063 T5 aluminum alloy material with a black anodize finish as the carriage 28, which avoids any difference of thermal expansion. The carriage 28 and the carriage rail 56 both include a series of attachment bolt holes 66, with each of the attachment bolt holes 66 of the carriage rail 56 using a helical stainless steel insert (not separately shown) so as to receive the attachment bolts 68 via a threaded connection. In the preferred embodiment, two outer bolt holes 66 are about 92 mm from each end, with two central bolt holes 66 spaced therebetween.

In the preferred anchoring arrangement, the reinforcement plates 60 are the only structure which makes contact with the top of the bed rail 12. Each reinforcement plate 60 need not be as long as the track 58, and in the preferred embodiment the reinforcement plates 60 are only about 380 mm long. The preferred reinforcement plates 60 are formed by bending and powder coating a relatively thin aluminum sheet, with the preferred sheet thickness being only 3 mm. The bent edge 70 provides stiffness and flatness to the reinforcement plate 60, while forming the reinforcement plate 60 out of powder coated aluminum helps avoid any damage or scarring of the top of the pickup truck bed rail 12, while still being sufficiently stiff, rigid, and immobile relative to the bed rail 12 so the bicycle mount 10 and bicycle 16 when mounted will not wobble relative to the bed rail 12.

With the above description of the carriage 28, carriage rail 56, tracks 58 and reinforcement plates 60, the method of securing the carriage 28 to the bed rail 12 is apparent. First the assembler places the bolt 52 of each stake pocket anchor 40 through one of the tracks 58 and reinforcement plate 60 and then into the stake pocket anchor 40, at the same time having the tracks 58 in a loose telescoping arrangement on the carriage rail 56. Preferably allowing only each reinforcement plate 60 but not the track 58 to contact the pickup truck bed rail 12, the assembler then positions the stake pocket anchors 40 where ever in the telescoping relationship is needed in the fore/aft direction to insert each stake pocket anchor 40 into its stake pocket 54. Each stake pocket anchor bolt 52 can then be tightened down and torqued, pressing the track 58 and reinforcement plate 60 down in their desired position on the pickup truck bed rail 12. At this point, due to the clearance between the carriage rail 56 and the sliding track 64 of each track 58, the carriage rail 56 can still be easily slid forward or rearward relative to the pickup truck bed rail 12. The assembler decides how far forward or rearward to position the carriage 28, and slides the carriage rail 56 to the desired position, with the carriage rail 56 still in a telescoping arrangement with both the front and the rear tracks 58. The assembler then uses the four mounting bolts 68 to attach the carriage 28 downward onto the carriage rail 56. In many assemblies, this will position a portion of the carriage 28 directly over at least one of the stake pocket anchor bolts 52, which may further assist in preventing theft such as if the stake pocket anchor bolt 52 uses a hexagonal allen wrench or similar head that requires vertical access for loosening. Torqueing the end mounting bolts 68 down causes the track 58 to be pinched between the carriage 28 and carriage rail 56, frictionally fixing the fore/aft position of both the carriage 28 and the carriage rail 56 relative to the track 58 and reinforcement plate 60 and thereby relative to the pickup truck bed rail 12. The central mounting bolts 68 are also tightened down.

As can be best seen in FIG. 3, the relative sizes and shapes of the reinforcement plates 60, the tracks 58 and the carriage 28 and the positioning of the bolt holes 66 are such that, when assembled there is a first gap 72 between the reinforcement plates 60 and the tracks 58 and a second gap 74 between the tracks 58 and the carriage 28. The net effect is to offset the carriage 28 toward the outside of the truck 14 (to the left in FIG. 3), while still adequately keeping the weight of the bicycle 16 over the bed rail 12 and over the outer wall of the bed rail 12. This offset of the carriage 28 (to the left in FIG. 3 due to the gaps 72, 74) is one mechanism that makes it less likely that either any of the hardware (such as the pivot arm 20 and hook 22) used in the bicycle mount 10 will scrape or mar the pickup truck 14, and further helps the user when hoisting the bike 16 to avoid any scraping or potentially damaging contact such as between a pedal of the bike 16 and a side wall of the truck 14.

The preferred primary upright stabilizer for the bicycle 16 is the pivot arm 20 and hook 22, shown in FIGS. 4-9. The pivot arm 20 is attached relative to the carriage 28 by an upper slide 76*u* and a lower slide 76*l*, shown only in FIG. 4. Each slide 76 is shaped to mate with its sliding recess 42 in the carriage 28, with a threaded bolt hole 78 centrally disposed therein. Each slide 76 is short enough and has enough clearance (such as 1 mm) relative to its sliding recess 42 so it easily slides in the longitudinal direction prior to being tightened, but also long enough so when tightened against the lips of the sliding recess 42 it will frictionally engage and prevent further movement. In the most preferred form, each slide 76 is formed of 6063 T5 aluminum alloy with a black anodize finish, with a stainless steel insert in the bolt hole 78 to provide thread strength. With the materials used, a 90 mm length has been found sufficient to provide the loose-sliding, tightened-frictionally-fixed engagement.

A pivot bolt 80 extends through a pivot hole 82 on the pivot arm 20, threading into the bolt hole 78 on the lower slide 76*l*. This pivot bolt 80 need only be loosened to change the longitudinal position of the pivot arm 20 and hook 22 on the carriage 28, and is otherwise tightened down to provide a pivot point for the pivot arm 20 and hook 22 which is then fixed relative to the carriage 28. In the preferred embodiment, the pivot bolt 80 is a shoulder bolt with a head tightenable via a tool, such as an allen wrench head. The shoulder of the pivot bolt 80 is slightly longer than the pivot hole 82 is deep (i.e., than the thickness of the pivot arm 20 at the pivot hole 82), so tightening of the pivot bolt 80 does not restrict pivoting of the pivot arm 20.

A knob 30, best shown in FIG. 8, extends through a pivot slot 84 on the pivot arm 20, threading into the bolt hole 78 on the upper slide 76*l*. The preferred knob 30 has a diameter of about 55 mm, and can be hand tightened to provide enough friction to secure the rotational position of the pivot arm 20 and hook 22. The preferred pivot slot 84 is linear rather than arced, resulting in the fact that, to pivot the pivot arm 20 and hook 22 on the carriage 28 after the lower slide 76*l* is fixed, the upper slide 76*u* must slide within the slide recess 42 of the carriage 28. With the pivot slot 84 having a preferred length of 72 mm and preferably positioned a center distance of 31 mm away from the pivot hole 82, the connection between the pivot arm 20 and the carriage 28 allows the pivot arm 20 to pivot 180°, from in line with the carriage 28 to any upwardly extending angle, but does not allow the pivot arm 20 to pivot below horizontal. Preventing the pivot arm 20 from pivoting below horizontal through use of the pivot bolt 80 and locking knob 30 is another mechanism to ensure that the pivot arm 20 does not come into contact with, scrape nor mar the side of the pickup truck 14.

The preferred knob 30 includes a lock 86, shown in FIG. 8 with an associated key 88. After the knob 30 has been tightened, locking allows the handle portion of the knob 30 to rotate freely without engagement or rotation of the threaded bolt portion of the locking knob 30. Thus, once the user decides and positions the pivot arm 20 in the desired angular position over the bicycle 16, turning of the key 88 locks the angular position of the pivot arm 20 for securing the bicycle 16 to the bicycle mount 10 and truck 14.

Figure 4:
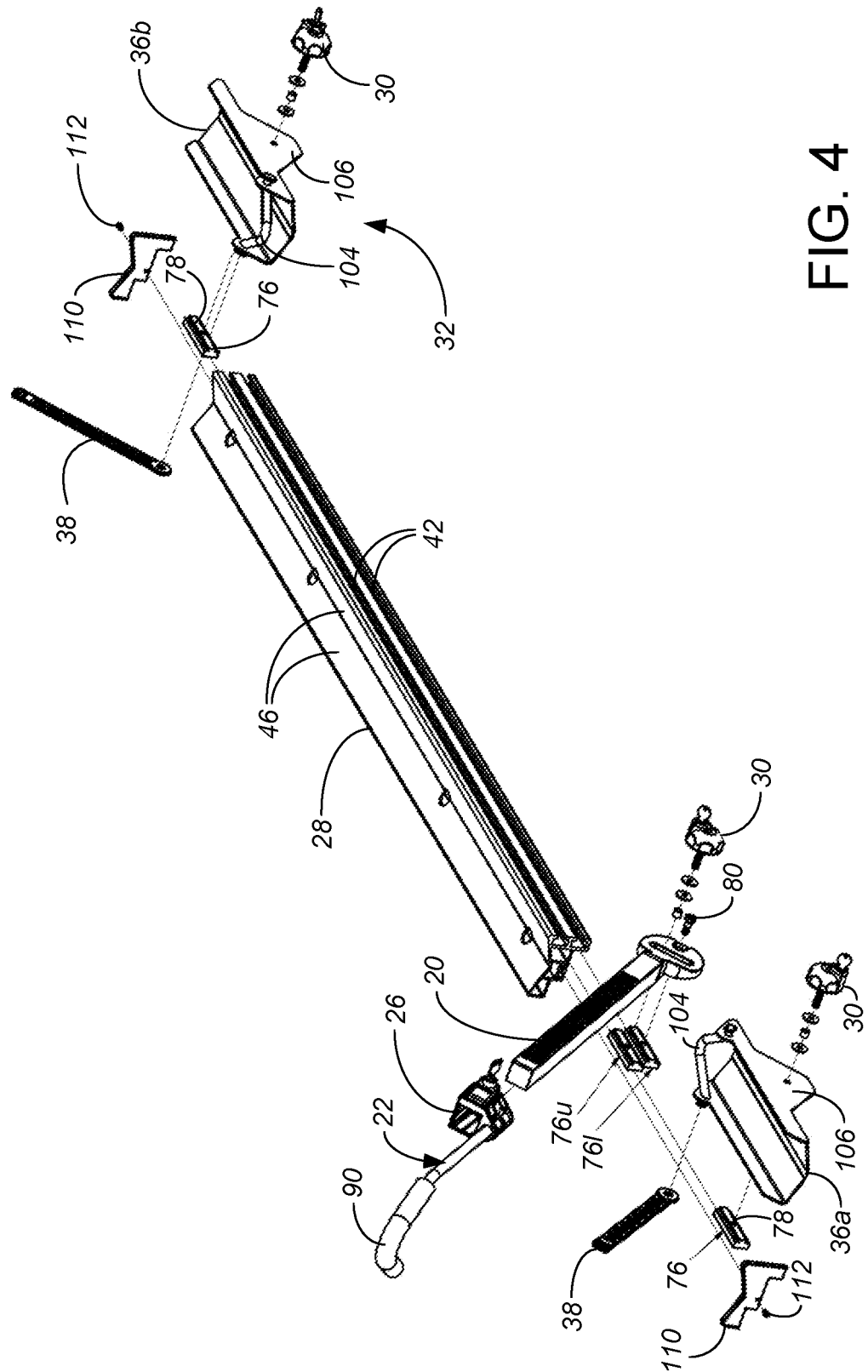
FIG. 4 is an exploded perspective view of the carriage assembly used in the bed rail bicycle mount of FIG. 1.
Figure 9:
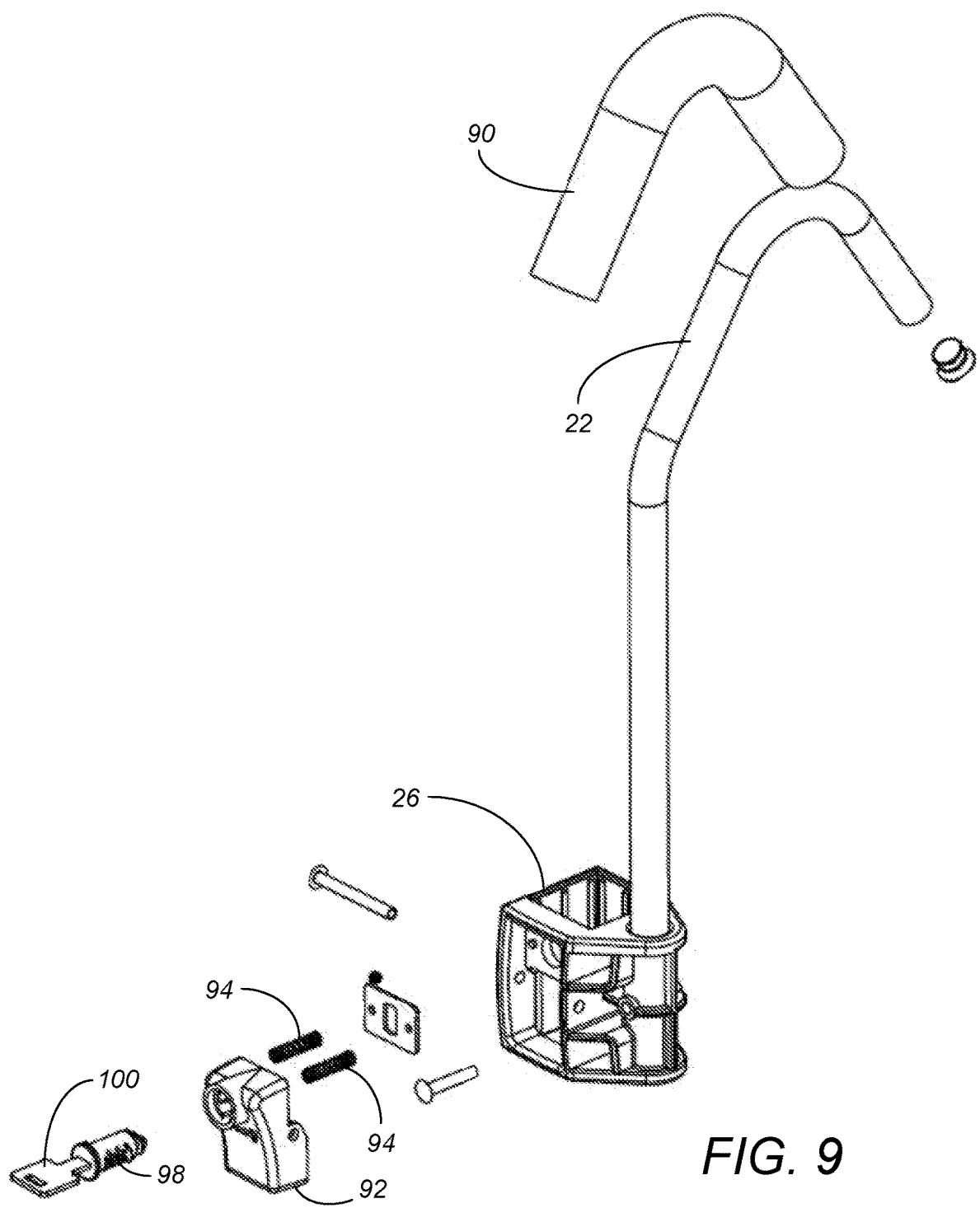
FIG. 9 is an exploded perspective view of the hook assembly used in the carriage assembly of FIGS. 1 and 4.
Figure 10:
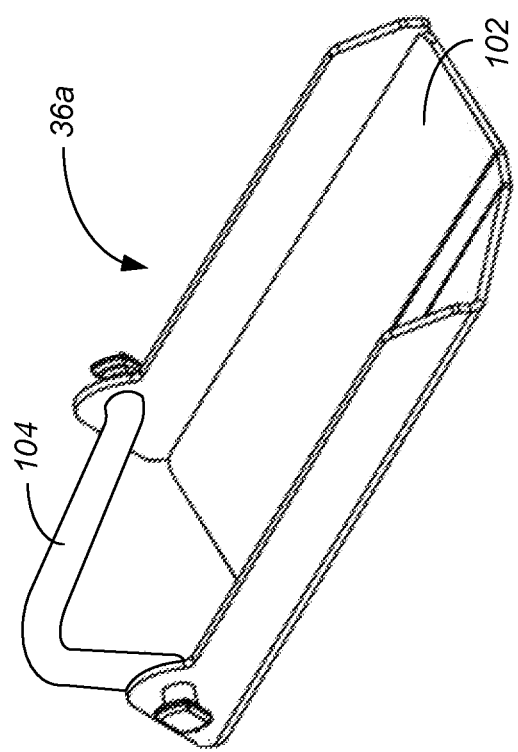
FIG. 10 is a inner side perspective view of one of the wheel supports in the carriage assembly of FIGS. 1 and 4.
Figure 11:
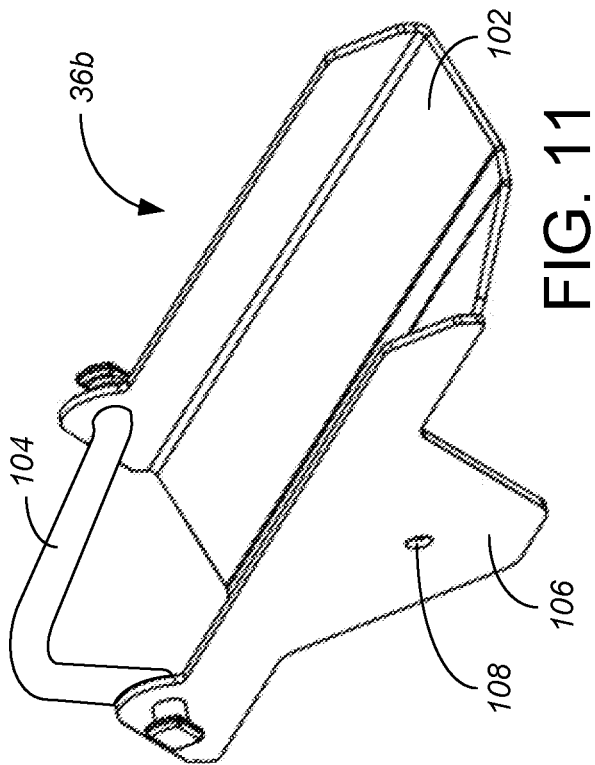
FIG. 11 is an outer side perspective view of the other of the wheel supports used in the carriage assembly of FIGS. 1 and 4.
Figure 12:
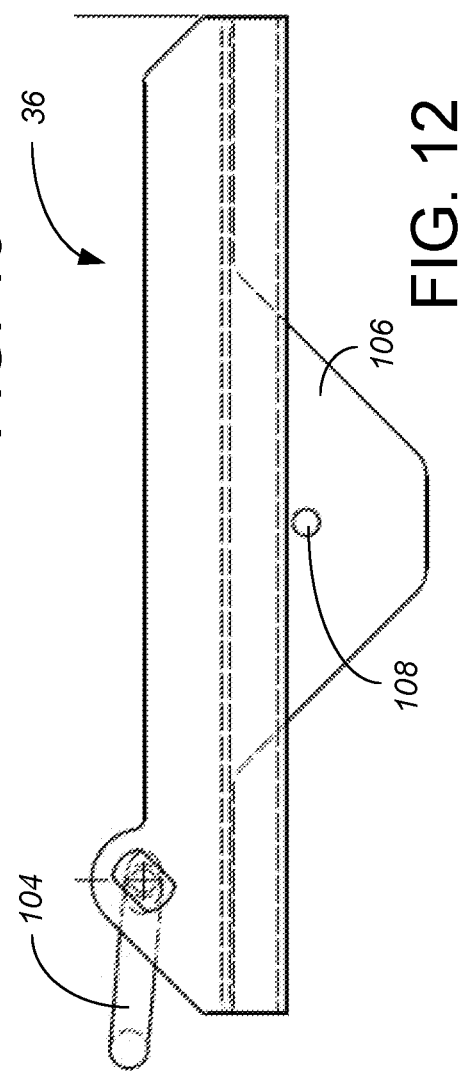
FIG. 12 is a side view of the wheel hoops of FIGS. 10 and 11.
Figure 13:
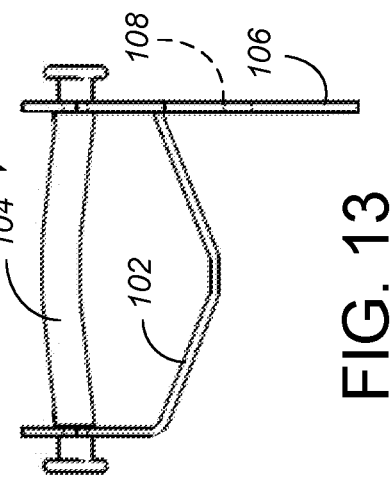
FIG. 13 is an end view of the wheel hoops of FIGS. 10-12.

The preferred hook 22 for the bed rail bicycle mount 10 is shown in FIGS. 4 and 9. The hook 22 is primarily a strong metal tube bent to loop over an upper portion of the bicycle 16 such as the bicycle frame 24. For instance, the tube may be formed from aluminum tubing within a softer EPDM synthetic rubber hook pad 90 which helps avoid damage to the bicycle 16 when tightening down. The hook 22 is joined to the pivot arm 20 in an extendable attachment, in this preferred case through a ratchet type mechanism 26. FIG. 9 thus shows a ratchet pawl mechanism 92, loaded with springs 94, that mates into ratchet teeth 96 on the pivot arm 20. Once the hook 22 is lengthened or shortened to the desired length relative to a particular bicycle frame 24, the ratchet mechanism 26 can be locked such as with a lock 98 and key 100. Once the user decides on the length of the hook 22/pivot arm 20, turning of the key 100 locks the ratchet mechanism 26 and fixes the length of the hook 22 for securing the bicycle 16 to the bicycle mount 10 and truck 14.

As alternatives to the extendable pivot arm 20/hook 22 as shown, the extendable hook mechanism could be substantially as disclosed in U.S. Pat. No. 6,695,184, 7,240,816 or 8,235,267, incorporated by reference. Similarly, other support arrangements for holding the bicycle 16 in a substantially vertical position above the carriage 28 could alternatively be used, including those disclosed in U.S. Pat. Nos. 10,124,740, 10,065,568, 10,011,237, 9,956,922, 8,235,267, 7,240,816, 7,044,347, 6,752,303, 6,695,184, 6,523,731 and 6,491,195 and in U.S. Pat. Pub. No. 2008/0142559, all incorporated by reference. Preferably the support arrangement places the majority of the bicycle weight on its wheels 34 rather than hanging the majority of the bicycle weight from the top of the bicycle 16. Having the majority of the bicycle weight on its wheels 34 places less stress on the upright(s) of the bed rail bicycle mount 10, usually while simultaneously aligning the front and rear wheels 34 with the forward vehicle direction for reduced wind resistance.

If desired, the bicycle mount 10 can be used with placing the tires/wheels 34 of the bicycle 16 directly on the top of the carriage 28. Alternatively, the bicycle mount 10 can include wheel supports 36 such as shown in FIGS. 1, 4 and 10-13. These preferred wheel supports 36 include a V-shaped tire placement section 102 which substantially matches the V-shape of the top surfaces 46 of the carriage 28, preferably formed of 3 mm thick 6061 aluminum sheet material. A wheel hoop 104 extends from one side of the wheel support 36 to the other, as well as providing end positions for a strap 38 (shown only in FIGS. 4 and 14). The preferred strap 38 is formed of a strip of thermoplastic elastomer which is 5 mm thick and about 25 mm wide, with a plurality of holes so as to be adjustable to fit any thickness of bike tires. The preferred wheel supports 36*a*, 36*b* also include a downwardly extending flange 106 having a bolt hole 108, configured so the bolt hole 108 will hang in front of and align with one of the sliding recesses 42. So the wheel hoops 104 of the two wheel supports 36*a*, 36*b*, can be positioned oppositely (either both pushing outward or both pushing inward on the bicycle wheels 34), the flange 106 is on the opposite right/left side for wheels support 36a as compared to wheel support 36b. A slide 76 for each wheel support 36 is placed in the appropriate height sliding recess 42. Thus, the user can select the longitudinal position of the two wheel supports 36 on the carriage 28 to identically match the spacing between the two wheels 34 on any bicycle 16. After the user decides on the longitudinal position of the two wheel supports 36, a locking knob 30 (as shown in FIG. 8, e.g., preferably identical to the locking knob 30 used for the pivot arm 20) can then be to fix each wheel support 36 to the carriage 28. The strap 38 is looped over the wheel rim and secured, holding the two bicycle wheels 34 in aligned positions on the bicycle mount 10. One benefit of using the wheel supports 36 is that the wheels supports 36 will cover at least one of the bolts 68 attaching the carriage 28 to the carriage rail 56, making it impossible for a thief to access and unscrew the bolts 68 and remove the carriage 28 from the carriage rail 56 so long as the wheel supports 36 are locked in their longitudinally fixed position.

After the slides 76 for the pivot arm 20 and the wheel supports 36 have been positioned into the track 58 of the carriage 28, end plates or caps 110 can be used to aesthetically cover the ends of the carriage 28. The preferred end caps 110 are molded of black plastic and each secured to an end of the carriage 28 using a single screw 112.

With the above description of the preferred pivot arm 20 and hook 22 and wheel supports 36, the method of use of the bicycle mount 10 is apparent. The user hoists the bicycle 16 so its wheels 34 are on the carriage 28, preferably within and on top of the wheel supports 36. The pivot arm 20 gravitationally folds down to a horizontal position for loading or unloading of the bicycle 16. Once the bike 16 is roughly in position, while releasing the majority of the weight of the bicycle 16 but still holding the bicycle 16 generally upright, the user pivots the pivot arm 20 and then lengthens and shortens the ratcheting connection 26 of the hook 22 so the hook 22 extends over the bicycle frame 24 to hold the bicycle 16 upright. Using the hand knob 30, the user tightens down the angular position of the pivot arm 20. If not already at the desired location, the user can then loosen (if not already loose), longitudinally slide, and then tighten down the hand knobs 30 so the wheel supports 36 exactly match the wheel base of the bicycle wheels 34. The user can then tighten the straps 38 around the inside of the wheel rims (through the spokes). If not at a secure location, the user can then lock each of the lock knobs 30 and the ratcheting mechanism 26, thereby locking the bike 16 to the pickup truck 14. For unloading of the bicycle 16, this order of steps is simply reversed.

Figure 15:
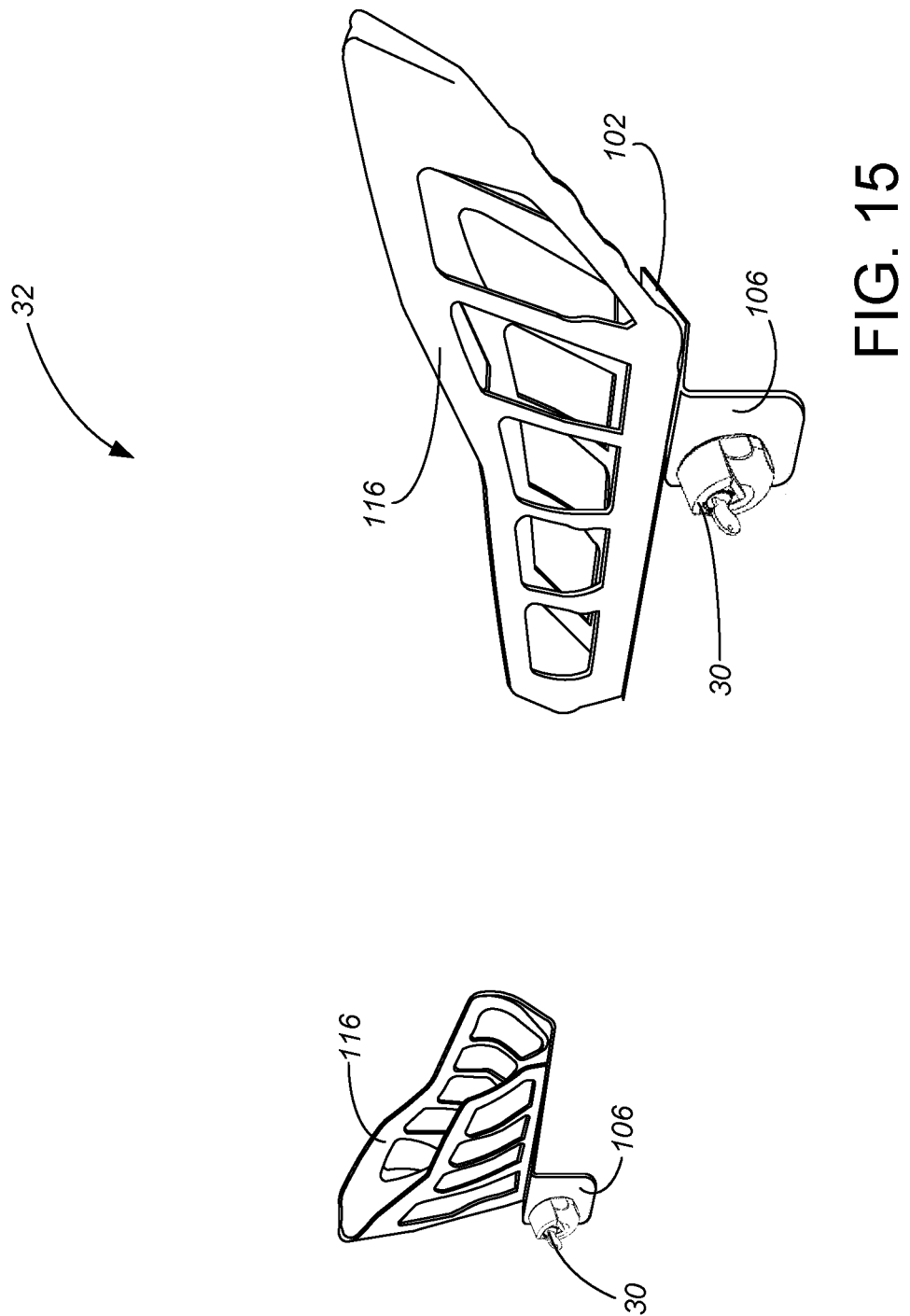
FIG. 15 is an outer side perspective view of a second alternative set of wheel supports.

FIGS. 14 and 15 show two alternative types of wheel securement structures 32, in which the wheel supports 114, 116 extend higher relative to the wheels 34 of the bicycle 16. This aids in keeping the front wheel 34 of the bicycle 16 from turning. This also aids in providing more support to keep the bicycle 16 vertical, rather than just relying on the pivot arm 20 and hook 22. In FIG. 14, the wheel supports 114 are formed from 3 mm thick aluminum sheet material, and the V-shaped tire placement section 102 slope upward for a portion of their length similar to the curvature of the bicycle wheel 34. In FIG. 15 the wheel supports 116 are molded of a hard thermoplastic polymer in the shape of a wheel basket on top of the V-shaped tire placement section 102, which may eliminate the need for a wheel strap 38. In both cases, the wheels supports 114, 116 can be used as shown to push outward against the two wheels 34 of the bicycle 16, or alternatively can be reversed as to front/back arrangement to push inward against the two wheels 34 of the bicycle.

It can readily be seen that the preferred embodiments provide elegant solutions to transporting one or two bicycles 16 using a pickup truck 14. The preferred embodiments can be assembled, installed and used by one person, on virtually any pickup truck 14 with any box length, and with any bicycle 16. The bicycle 16 is aligned with the direction of travel of the pickup truck 14 for minimal air resistance, in a location that is least likely to interfere with the mirrored and rear views of the driver. When in use, the mounted bicycle 16 neither interferes with the use of the pickup truck bed 18 nor lengthens the pickup truck 14 (highly beneficial, for instance, when parallel parking in a tight parking spot). The bicycle 16 is easily locked and securely held in place. The likelihood of damage or scraping of the pickup truck 14 is minimized, and no permanent alterations or additional hole in the pickup truck 14 are needed. The bicycle mount 10 can be moved from one pickup truck 14 to another whenever necessary. The bicycle mount 10 is relatively low in cost and easy to manufacture, with corrosion resistant parts in a robust design that allows for years or decades of use. Still, should any of the component parts become damaged or otherwise in need of replacement, each part can be easily separately removed and replaced.

Although the present invention has been described with reference to preferred embodiments, workers skilled in the art will recognize that changes may be made in form and detail without departing from the spirit and scope of the invention.

The invention claimed is:

1. A bed rail bicycle mount for use on a pickup truck comprising:
   a carriage structure for supporting the wheels of a bicycle, the carriage structure being positionable to run longitudinally over the bed rail of a pickup truck; and
   a primary vertical support, extending upwardly from the carriage structure, the primary vertical support having a bottom connection end where it connects to the carriage structure and a top attachment end configured to detachably attach to the bicycle above a bicycle wheel axis, the primary vertical support being positionable to hold the bicycle generally upright over the carriage structure and with the wheels of the bicycle on the carriage structure, with the wheels of the bicycle being higher than the top of the bed rail such that the top attachment end can stabilize the bicycle as the pickup truck is driven around left and right corners, and such that the bottom connection end can withstand moments the generally upright bicycle places on the carriage structure as the pickup truck is driven around left and right corners, with the bottom connection end being able to withstand the moments placed on the carriage structure by the primary vertical support as the pickup truck is driven around left and right corners.

2. The bed rail bicycle mount of claim 1, wherein the carriage structure comprises a V-shaped top surface for supporting and centering tires of the bicycle, the V-shaped top surface being supported over and by at least one interior vertical support wall.

3. The bed rail bicycle mount of claim 1, wherein the carriage structure comprises at least one sliding recess, and wherein the primary vertical support includes at least one slide received in the sliding recess that, when loose, allows longitudinal sliding movement of the primary vertical support relative to the carriage structure, and when tight frictionally secures the longitudinal position of the primary vertical support relative to the carriage structure.

4. The bed rail bicycle mount of claim 3, wherein the sliding recess is open to the outside of the pickup truck, and positionable wider than the outside of the bed rail so as to help avoid damaging contact with the bed rail during use of the bed rail bicycle mount.

5. The bed rail bicycle mount of claim 3, wherein the primary vertical support is secured to the slide with a locking knob which is hand rotatable between a tightened locked position and a loosened unlocked position.

6. The bed rail bicycle mount of claim 3, wherein the carriage structure is formed with a wall thickness defining the slide recess for holding the primary vertical support upright which is greater than a wall thickness for supporting the wheels of the bicycle wheels.

7. The bed rail bicycle mount of claim 6, wherein the carriage structure is extruded from an aluminum-based metal.

8. The bed rail bicycle mount of claim 1, further comprising two wheels supports longitudinally positioned on and vertically over the carriage structure for positioning one wheel support under each wheel of the bicycle.

9. The bed rail bicycle mount of claim 8, wherein the carriage structure comprises at least one sliding recess, and wherein each wheel support includes at least one slide received in the sliding recess that, when loose, allows longitudinal sliding movement of the wheel support relative to the carriage structure, and when tight frictionally secures the longitudinal position of the wheel support relative to the carriage structure.

10. The bed rail bicycle mount of claim 1, wherein the primary vertical support includes a hook which is on an angularly adjustable pivot arm relative to the carriage structure, the pivot arm being able to pivot about an axis perpendicular to the longitudinal direction of the carriage structure.

11. The bed rail bicycle mount of claim 10, wherein the hook is extendable and retractable on the pivot arm.

12. The bed rail bicycle mount of claim 1, wherein the primary vertical support includes a pivot arm which is both angularly and longitudinally adjustable relative to the carriage structure,
wherein the carriage structure comprises an upper sliding recess and a lower sliding recess, and wherein the primary vertical support includes an upper slide received in the upper sliding recess and a lower slide received in the lower sliding recess, each of the upper and lower slides when loose allowing longitudinal sliding movement relative to the carriage structure, and when tight frictionally securing the slide relative to the carriage structure, with the longitudinal positions of the slides being selectable to determine both the longitudinal position and the angular position of the pivot arm.

13. A bed rail bicycle mount for use on a pickup truck comprising:
a carriage structure for supporting the wheels of a bicycle;
two stake pocket anchors extending downwardly from the carriage structure which are tightenable to secure the carriage structure into stake pockets on the bed rails of a pickup truck;
a primary vertical support, extending upwardly from the carriage structure and positionable to hold the bicycle generally upright over the carriage structure and with the wheels of the bicycle on the carriage structure; and
at least one track disposed in a telescoping relationship relative to the carriage structure, so the same bed rail bicycle mount can be used on different pickup trucks with differing distances between their stake pockets.

14. The bed rail bicycle mount of claim 13, further comprising:
a carriage rail securable to the carriage structure with a plurality of fasteners, with two tracks in a telescoping relationship on each end of the carriage rail, the carriage rail being longitudinally slidable relative to the tracks when the fasteners are loose, the carriage structure and the carriage rail being longitudinally fixed relative to the tracks when the fasteners are tightened.

15. The bed rail bicycle mount of claim 13, further comprising:
a reinforcement plate positioned between the track and the bed rail, the reinforcement plate being longitudinally position by a stake pocket anchor bolt extending through an opening in the reinforcement plate.

16. A method of supporting a bicycle on a pickup truck comprising:
securing a bed rail bicycle mount to run longitudinally generally over the top of a bed rail of the pickup truck, the bed rail bicycle mount comprising:
a carriage structure having a top surface for supporting the wheels of a bicycle and a bottom surface contacting the top of the bed rail of the pickup truck; and
a primary vertical support, extending upwardly from the carriage structure;
the securing act fixing the carriage structure including its bottom surface and top surface relative to the bed rail;
hoisting a bicycle so its wheels are on the top surface of the carriage structure; and
securing the primary vertical support relative to the bicycle so the primary vertical support holds the bicycle generally upright over the carriage structure and with the wheels of the bicycle on the carriage structure.

17. The method of claim 16, wherein the primary vertical support comprises a hook on a pivot arm, the pivot arm being able to pivot about an axis perpendicular to the longitudinal direction of the carriage structure, and wherein the act of securing the primary vertical support relative to the bicycle comprises adjusting the length of the hook and the angular position of the pivot arm so the hook loops over the top of a frame of the bicycle.

18. A method of supporting a bicycle on a pickup truck comprising:
securing a bed rail bicycle mount to run longitudinally generally over the top of a bed rail of the pickup truck, the bed rail bicycle mount comprising:
a carriage structure for supporting the wheels of a bicycle; and
a primary vertical support, extending upwardly from the carriage structure;
hoisting a bicycle so its wheels are on the carriage structure; and
securing the primary vertical support relative to the bicycle so the primary vertical support holds the bicycle generally upright over the carriage structure and with the wheels of the bicycle on the carriage structure,
wherein the bed rail bicycle mount further comprises two stake pocket anchors extending downwardly from the carriage structure, the method further comprising:
adjusting a longitudinal distance between the stake pocket anchors so they mate into stake pockets on the bed rails of a pickup truck; and tightening the stake pocket anchors to hold the carriage structure to the top of the bed rail.

19. The method of claim 18, wherein the bed rail bicycle mount further comprises a carriage rail securable to the carriage structure with a plurality of fasteners, with two tracks in a telescoping relationship on ends of the carriage rail, the carriage rail being longitudinally slidable relative to the tracks when the fasteners are loose, the method further comprising:
   adjusting the longitudinal position of the carriage rail relative to the tracks; and
   tightening the fasteners to longitudinally fix the carriage structure and the carriage rail relative to the tracks.

20. A bed rail bicycle mount for use on a pickup truck comprising:
   a carriage structure for supporting the wheels of a bicycle, the carriage structure being positionable to run longitudinally over the bed rail of a pickup truck, wherein the carriage structure comprises a first sliding recess running longitudinally and a second sliding recess running longitudinally and parallel to the first sliding recess; and
   a primary vertical support, extending upwardly from the carriage structure and positionable to hold the bicycle generally upright over the carriage structure and with the wheels of the bicycle on the carriage structure, with the wheels of the bicycle being higher than the top of the bed rail, the primary vertical support contacting the bicycle above a bicycle wheel axis to stabilize the bicycle as the pickup truck is driven around left and right corners, wherein the primary vertical support includes a first tightenable slide and a second tightenable slide, the first slide being received in the first sliding recess and the second slide being received in the second sliding recess, each slide when loose allowing longitudinal sliding movement relative to the carriage structure, and when tight frictionally securing the slide relative to the carriage structure, with the longitudinal positions of the slides being selectable to determine the longitudinal position of the primary vertical support on the carriage structure, with spacing between the slides transferring moments between the primary vertical support and the carriage structure for stabilizing the bicycle as the pickup truck is driven around left and right corners.

* * * * *